(12) United States Patent
Burgess et al.

(10) Patent No.: US 10,222,448 B2
(45) Date of Patent: Mar. 5, 2019

(54) METHOD FOR FINGERPRINT BASED LOCALIZATION OF MOBILE DEVICES

(71) Applicant: indoo.rs GmbH, Brunn Am Gebirge (AT)

(72) Inventors: Thomas Burgess, Brunn Am Gebirge (AT); Markus Krainz, Vienna (AT)

(73) Assignee: indoo.rs GmbH, Brunn am Gebrige (AT)

( * ) Notice: Subject to any disclaimer, the term of this patent is extended or adjusted under 35 U.S.C. 154(b) by 140 days.

(21) Appl. No.: 14/898,236

(22) PCT Filed: Jun. 13, 2014

(86) PCT No.: PCT/EP2014/062388
§ 371 (c)(1),
(2) Date: Dec. 14, 2015

(87) PCT Pub. No.: WO2014/198898
PCT Pub. Date: Dec. 18, 2014

(65) Prior Publication Data
US 2016/0202341 A1    Jul. 14, 2016

Related U.S. Application Data (60) Provisional application No. 61/834,894, filed on Jun. 14, 2013, provisional application No. 61/835,553, filed on Jun. 15, 2013.

(51) Int. Cl.
G01S 3/02    (2006.01)
G01S 5/02    (2010.01)

(52) U.S. Cl.
CPC ............ G01S 5/0252 (2013.01); G01S 5/021 (2013.01)

(58) Field of Classification Search
CPC .................................... G01S 5/0252
USPC ............ 342/450, 451, 452; 455/456.1, 456.2
See application file for complete search history.

(56) References Cited

U.S. PATENT DOCUMENTS

| | | |
|---|---|---|
| 7,532,113 B2 | 5/2009 | Krumm et al. |
| 2009/0253436 A1 | 10/2009 | Nientiedt |
| 2010/0324813 A1 | 12/2010 | Sundararajan et al. |
| 2012/0289242 A1 | 11/2012 | McCarthy et al. |
| 2013/0012230 A1 | 1/2013 | Alles et al. |

FOREIGN PATENT DOCUMENTS

WO    2012/004420 A1    1/2012

OTHER PUBLICATIONS

Quian Dong et al., "Evaluation of the Reliability of RSSI for Indoor Localization", Wireless Communication in Unusual and Confined Areas (ICWCUCA), Aug. 29, 2012, pp. 1-6, International Conference on, IEEE.

*Primary Examiner* — Dao L Phan
(74) *Attorney, Agent, or Firm* — Jordan IP Law, LLC; Todd A. Vaughn (57) ABSTRACT

Improvements in fingerprint based localization methods of mobile devices using precomputed reference maps with time series of fingerprints taken along some physical path, involving dynamic benchmarking of arbitrary paths within the map, generation of fingerprint points, location estimates, and creation of heat maps.

22 Claims, 8 Drawing Sheets

METHOD FOR FINGERPRINT BASED LOCALIZATION OF MOBILE DEVICES

CROSS-REFERENCE TO RELATED APPLICATIONS

The present application is a National Stage Application of PCT International Application No. PCT/EP2014/062388 (filed on Jun. 13, 2014), under 35 U.S.C. § 371, which claims priority to U.S. Provisional Patent Application Nos. 61/834,894 (filed on Jun. 14, 2013) and 61/835,553 (filed on Jun. 15, 2013), which are each hereby incorporated by reference in their respective, complete entireties.

TECHNICAL FIELD

Embodiments relate to improvements in fingerprint based localization methods of mobile devices using precomputed reference maps with time series of fingerprints taken along some physical path. Embodiments specifically relate to dynamic benchmarking of arbitrary paths within the map, generation of fingerprint points, location estimates, and creation of heat maps.

BACKGROUND

In this context, a fingerprint is any measurement of some well-defined signal. The source of the signal can be a known transmitter such as a WiFi access point, a Bluetooth beacon, an ultra wide band radio (UWB), or some other kind of known transmitter. Furthermore, it can also be a signal without a singular source, such as a magnetic field strength or a change in atmospheric pressure. A fingerprint path is a time series of fingerprint sets taken along some physical path. A path may consist of multiple path segments joined by path nodes. Typically, the time at each node and fingerprint is known to high accuracy. Multiple types of fingerprint paths with different applications are considered.

Known paths consist of fingerprints measured while moving along a path with known nodes. The node locations can be manually determined, either prior to the measurement or while the measurement is underway. Alternatively, locations can be determined using image recognition and camera input or proximity positioning techniques such as tags (i.e. RFID, NFC or QR codes). The node locations are usually known to high accuracy, whereas the fingerprints only have time stamps. However, their positions can be inferred with some assumptions on measurement frequency and movement uniformity.

A reconstructed path is constructed by feeding a fingerprint time series to the localization to estimate the position of each measurement. This is the equivalent of the positions reported to a client using localization. Here, it is possible to include other effects such as latency and averaging in intermediate layers between the detecting device and the output data.

An unknown path consists of fingerprints taken while moving along a path where the node locations are not known. Such a path can still be reconstructed, but does not have a clear ground truth for comparisons. Unknown paths can be harvested from clients using localization. A virtual path is made from artificially generated fingerprints by interpolating between map reference fingerprints along some well defined path. This acts as a known path, but with an additional error in the fingerprints due to interpolation errors. A compound path is a combination of paths, possibly even of different path types.

A reference map consists of a set of known locations (reference points) each with a set of reference measurements (fingerprints) of a number of identifiable sources. The reference data can be measured signal strength. When measuring, a time stamp as well as a set of fingerprints from ascertainable signals are recorded. The set of signal sources can be filtered depending on the map requirements. One or more receiving devices can be used for the measurement. Often series of such sets are measured, for example time series of fingerprints taken while moving. The measurements can also be associated with a ground truth position or path. These ground truth coordinates can be pure two dimensional positions, pseudo three dimensional with an additional floor number coordinate, a semantic description of a position such as entrance or fully three dimensional coordinates. The coordinates can be given relative to some fix point on the reference map, or in some global system such as WGS84, or even some combination of relative and global coordinates.

Given a query measurement at an unknown position, the position can be estimated (reconstructed) by comparing the fingerprint in the query to those in the reference map. Typically the reconstruction is done by combining the positions of the reference points most similar to the query. A path recording is data obtained using a mobile device to record reference data while moving. The path data consists of a set of positions and measurements each taken at some known time. Intermediate positions between the path positions can be approximated using linear interpolation. A known path has known ground truth positions given at certain times. A reconstructed path uses localization techniques to infer the path taken while recording. A virtual path follows a known path but uses interpolation of reference map data instead of a recording.

Such fingerprint-based localization methods are well known in the state-of-the-art. For example, the document WO2013/034585 describes a method and system for the localization of a communication device using radio fingerprints.

There are also several problems, however, related to indoor navigation through fingerprinting. The creation of the reference map requires a large set of manual on site measurements which is labor intensive. The positioning accuracy can be highly dependent on the spatial fingerprint distribution. An uneven density might give biases in the localization, too low density might give large random errors and too high density might lead to a lot of redundant data in the map. Due to hardware limitations, often only a subset of all available signals is recorded when measuring, which can lead to gaps in the reference map. This problem is even more pronounced in mobile devices, typically when navigating only a subset of referenced signals are available. Any errors in the reference map ground truth can propagate to errors in the positioning accuracy. Finally, the signal environment is likely to change over time. Thus, the map may gradually become out of date with degraded positioning accuracy.

SUMMARY

Thus, the object of the invention is to improve common fingerprint-based localization methods. One particular object of the invention is to provide a method to benchmark any set of reference points or a complete reference map, so as to enable the improvement of the map. Another object of the invention is to provide accurate estimates of the expected radio signal between and around existing reference points.

This and other objects are achieved by the methods as described in the claims, the description of the embodiments, and the figures.

The method of the invention preferably comprises the following steps: gather a number of fingerprints, preferably by moving a signal receiver preferably along a straight line and preferably at constant speed between at least two known locations $N_i$ within the geographical area and, at distinct time steps $t_i$, store the received fingerprints at this location; query the localization method to estimate query locations $L_i$ at every time step $t_i$ based on the received fingerprints, wherein all query locations $L_i$ define the query path; in a post-processing step, for each query location $L_i$ in the query path, determine a corresponding point $C_i$ by a preferably linear interpolation between the known points $N_i$ based on the recorded time steps and the distance between the known points $N_i$, calculate the residual $R_i$ between the query location $L_i$ and the corresponding point $C_i$, wherein the residual is preferably the Euclidean distance between $L_i$ and $C_i$, calculate a benchmark score based on all residuals $R_i$ over the query path, preferably by using the mean value, the median value, percentiles or extreme values of the residuals, wherein a lower benchmark score indicates a better estimation quality.

The so calculated dynamic benchmark score measures the similarity between a query path and a path of corresponding points. Time steps are relative to the first location in the reference path. Residuals are calculated between each query location and each corresponding point. The residual is the Euclidean distance between the two points. The corresponding point is found by linear interpolation between locations before and after query location so that there is one residual from each query location. The benchmark score is calculated as summary statistic on the obtained residuals. The choice of statistic depends on application, often it is mean, but can also be median, percentiles or extreme values. The benchmark score is lower when similarity is greater. The scores can be used to compare different sets of inputs.

DRAWINGS

Embodiments will be illustrated by way of example in the drawings and explained in the description below.

FIG. 5 shows two paths divided into segments depending on which region (indicated by patterning) they are in.

DESCRIPTION

Figure 1:
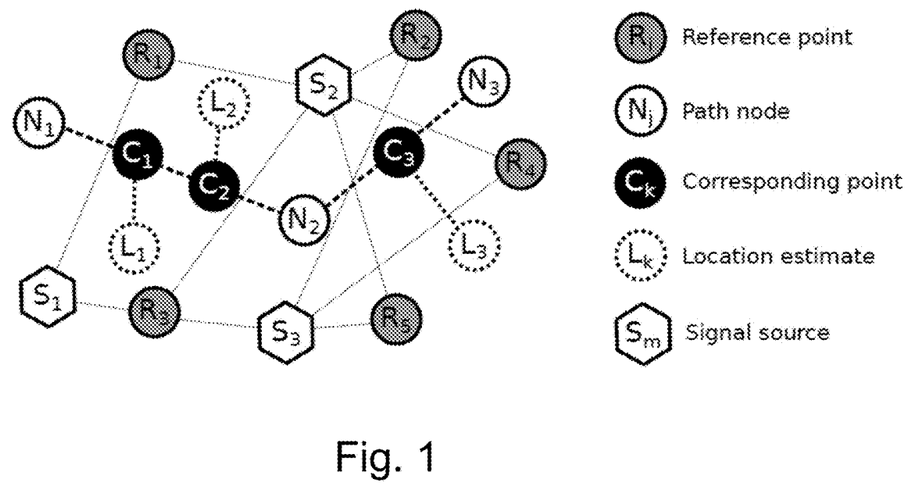
FIG. 1 shows a geographic area with signal sources S1-S3 and reference points R1-R5.

The method is further described by means of FIG. 1, which shows a geographic area with signal sources S1-S3 and reference points R1-R5. The device travels from known point N1 over N2 to N3. Using the location method based on a reference map, estimated locations L1, . . . , L3 are calculated. For each location there is a corresponding point on the known path C1, C2 and C3. The residuals between the known positions C1-C3 and the reconstructed positions L1-L3 are indicated as dotted lines.

Figure 2:
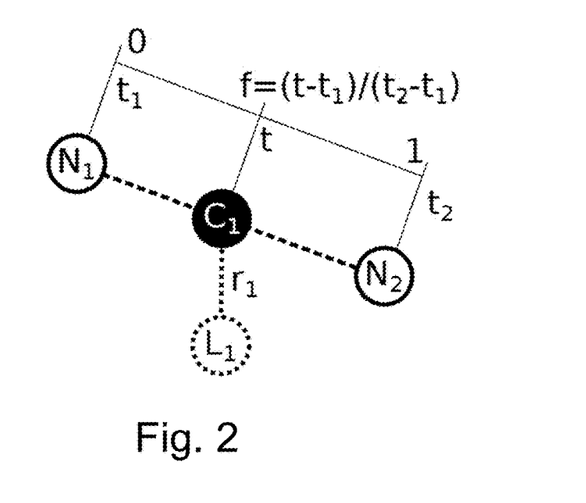
FIG. 2 shows how the position of the corresponding C1, C2 and C3 point is determined, given a location and a known track which the device follows.

FIG. 2 shows how the position of the corresponding C1, C2 and C3 point is determined, given a location and a known track which the device follows. First, the known path nodes N1 and N2 occurring before and after the location are selected. Then, the time fraction $f=(t-t1)/(t2-t1)$ indicates how close to the second point should be. The point location of C1 is found by linear interpolation $(1-f) \times x1 + f x2$, where $x1$ is the coordinate of earlier node N1, and $x2$ the coordinate of the later node N2.

Figure 3:
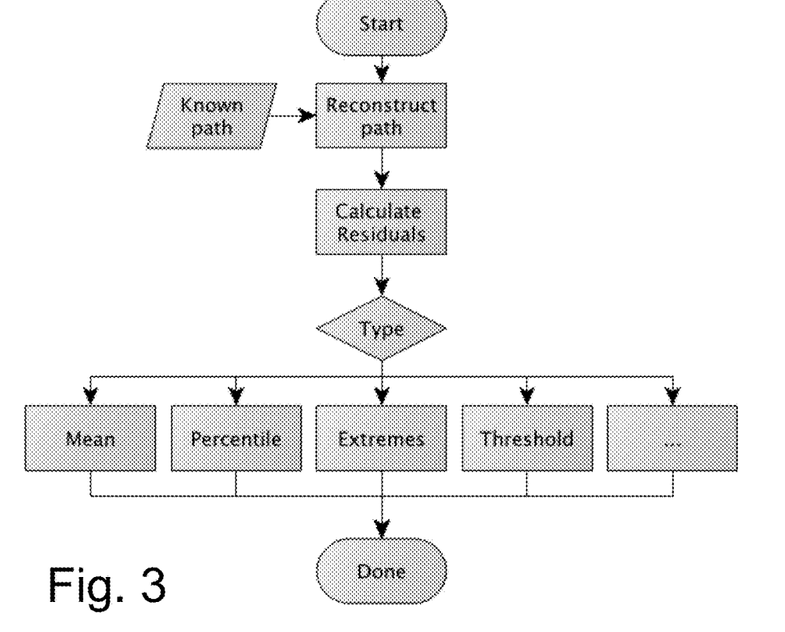
FIG. 3 shows a flow chart for the process of computing a benchmark.

In this method, residuals between the known and reconstructed positions from fingerprints along a known path (or compound of known paths) are analyzed. From the distribution of residuals a number of benchmark statistics can be calculated. These can be simple summary statistics such as averages, percentiles, histograms or extreme values. Additionally, more sophisticated measures can be calculated such as how often the deviation is larger than some threshold or identification of extreme outliers. In FIG. 3 a flow chart for the process of computing a benchmark is shown.

According to the invention, it is further provided that a comparative benchmark score is calculated for different sets of known points $N_i$ within the geographical area, particularly but not limited to known points $N_i$ that are stored in the reference map of the localization method.

Figure 4:
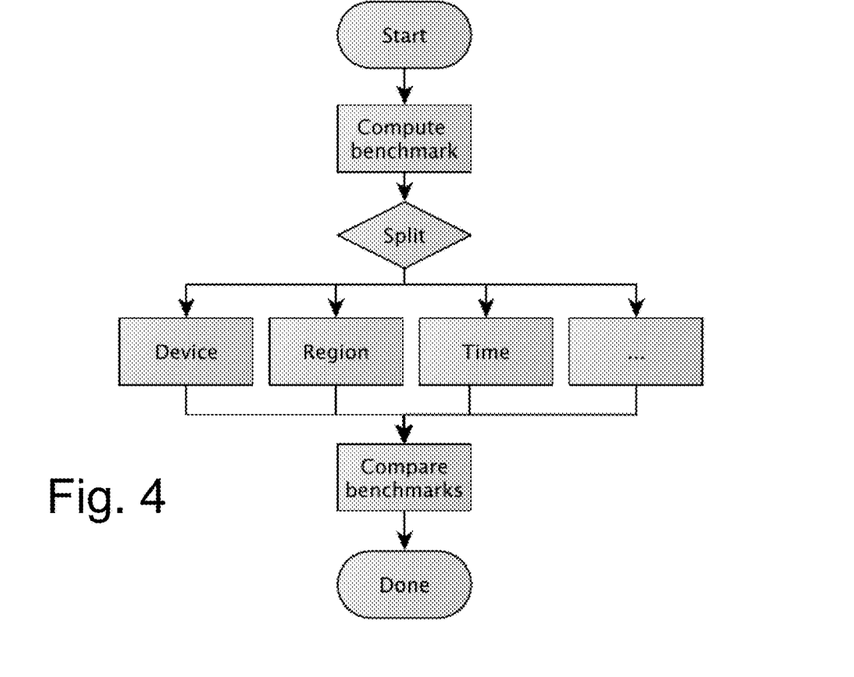
FIG. 4 shows a flowchart of benchmark comparisons.

For this, the dynamic benchmarking is repeated on different sets of paths to find differences between them. As input data, several sets of data for dynamic benchmarking are used. Then, for each set, the benchmark score is calculated. The sets are ordered by their benchmark score. Sets with low scores show better agreement. Focus can be set on sets near extremes for improving location accuracy. Such comparisons can be used to investigate localization performance. Devices can be compared using paths measured with multiple devices. This can be used to rank devices by performance and may be used to identify calibration issues. With recordings from different times trends can be identified and used to understand periodical behaviors such as crowding, and to easily identify changes in the signal environment. Comparing benchmarks from different regions can help find problematic regions in the reference maps. In FIG. 4 a flowchart of benchmark comparisons is shown.

According to the invention, the method can further be used to correct for time delay in a radio-based localization method. Due to lag in measurements, algorithm processing times and data I/O reconstructed locations can be delayed by some amount dt. The amount of delay may depend on device and implementation. Without compensation the delay can impair user experience, degrade localization accuracy and complicate comparisons between data sets. For this, the method comprises the following steps: calculate a benchmark score for a query path, wherein an offset dt is added to the time step $t_i$ at every query location $L_i$; repeat with different time step offset dt within a range of time step offset; identify the time step offset which results in the minimal benchmark score. As input data, reconstructed recordings along known paths are used. The stored reconstructed path data is modified by applying a global time offset $dt_i$ to each of the locations it contains. Then, dynamic benchmarking is performed on the modified and known paths. This is repeated with different $dt_i$ until the benchmark score reaches a minimum. Typically there is a single minimum which can be found efficiently using an interval halving method, parabolic fit or a simple 1D grid search. The timing in the localization algorithm is then corrected by applying min(dti) to the location times.

Figure 5:
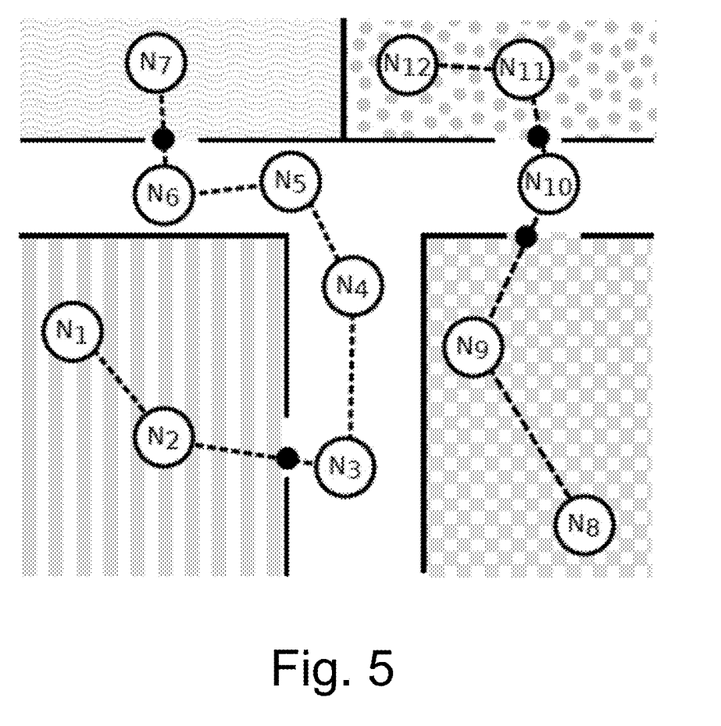

The pattern of reference points, the pattern of signal sources, and the physical environment all may affect localization accuracy. These effects can vary with position in the reference map. According to the invention, the method can be used to to determine the estimation quality inside a sub-area of a geographical area. Here, the method comprises the following steps: For at least one query path between at least two points within the geographical area covering several sub-areas, a baseline benchmark score is calculated. Then, the query path is divided into sub-paths within distinct contiguous geographical regions, based on a uniform grid, or on geographic criteria such as rooms or floor levels. For each sub-path, a benchmark score is calculated. The sub-path benchmark scores are compared to the baseline benchmark score to determine regional path estimation quality. Unions of segments within each region are used for each dynamic benchmarking. Then, the regions are ordered by benchmark score and compared to the baseline score. Regions with significantly higher benchmark score are flagged for improvement. Typical improvements can be adding/remeasuring references or installing tuning signal sources The method is further described with respect to FIG. 5, which shows two paths divided into segments depending on which region (indicated by patterning) they are in. Here each room defines one region. In places where path enters/leaves a region the path segment begins/ends at the point where it intersects the region. The time of at the intersection is found using linear interpolation. For the regional benchmarking the union of all segments within a region is considered, so for the white corridor in the picture there are 2 segments, with 5 path node points, and an additional 4 intersection points.

The validity of reference points decrease over time as building environment gradually changes. Identifying degradation before it goes to far allows venue owners to take action before end customer experience is significantly affected. Furthermore, effects such as large amounts of people, operation of machinery such as elevators, or opening/closing of doors, may temporary change the signal environment. Finding out when these occurs may help alleviating any issues this can cause, and in addition may provide valuable map usages analytics for venue owners. According to the invention, the method can be further used to determine such temporal differences, particularly temporal drift of path estimation quality.

For this, a baseline benchmark score is calculated for at least one path; at later points in time, further benchmark scores are calculated for the same path. Then, recurring patterns of variation or decay of estimation quality can be identified by comparing the difference between the benchmark scores and the baseline benchmark score over time. The paths are sorted depending on the desired time rang: For a full time series, all paths are sorted by starting time. For a recurrent binning, the paths are sorted by some recurrence pattern, such as time of day (i.e. hour, am/pm, rush hours/ still hours etc), day of week (i.e. day, weekend/weekday etc.). Then, comparative benchmarks are calculated for each sorted group of reconstructed paths. The comparative benchmarks are then compared. This allows, for a full time series, to visualize decay of map over time to identify when update is needed. For recurrence pattern, it allows to identify crowding effects, interference from machinery, doors, and further effects according to the invention, the method can further be used to improve the path estimation quality in a radio-based localization method, wherein the method comprises the following steps: calculate a benchmark score for at least one query path, wherein at least one parameter of the applied localization method is adjusted, repeat with different values of the parameters of the localization method, identify the set of adjustments which results in the minimal benchmark score.

First, reconstructed paths are calculated for each recording. A base line benchmark score is calculated. Dynamic benchmarking of known versus reconstructed unions of input data is performed. In the next step, some location parameter of the location method are varied. Preferably, simple equidistant values in a predetermined range can be used, but it is also possible to vary multiple values in multiple ranges. The procedure is repeated for each variation. Finally, location parameter are selected which provide the lowest benchmark score. Therefore, the method can be used for automating tuning maps and localization as well as for determining influence of factors. The automated tuning is made by varying parameters and searching for the combination that produces the best benchmark. Factor influence can be determined by comparing the benchmark excluding the factor with the complete benchmark one. Scanning this way through multiple factors gives a handle on relative importance of factors.

Figure 6:
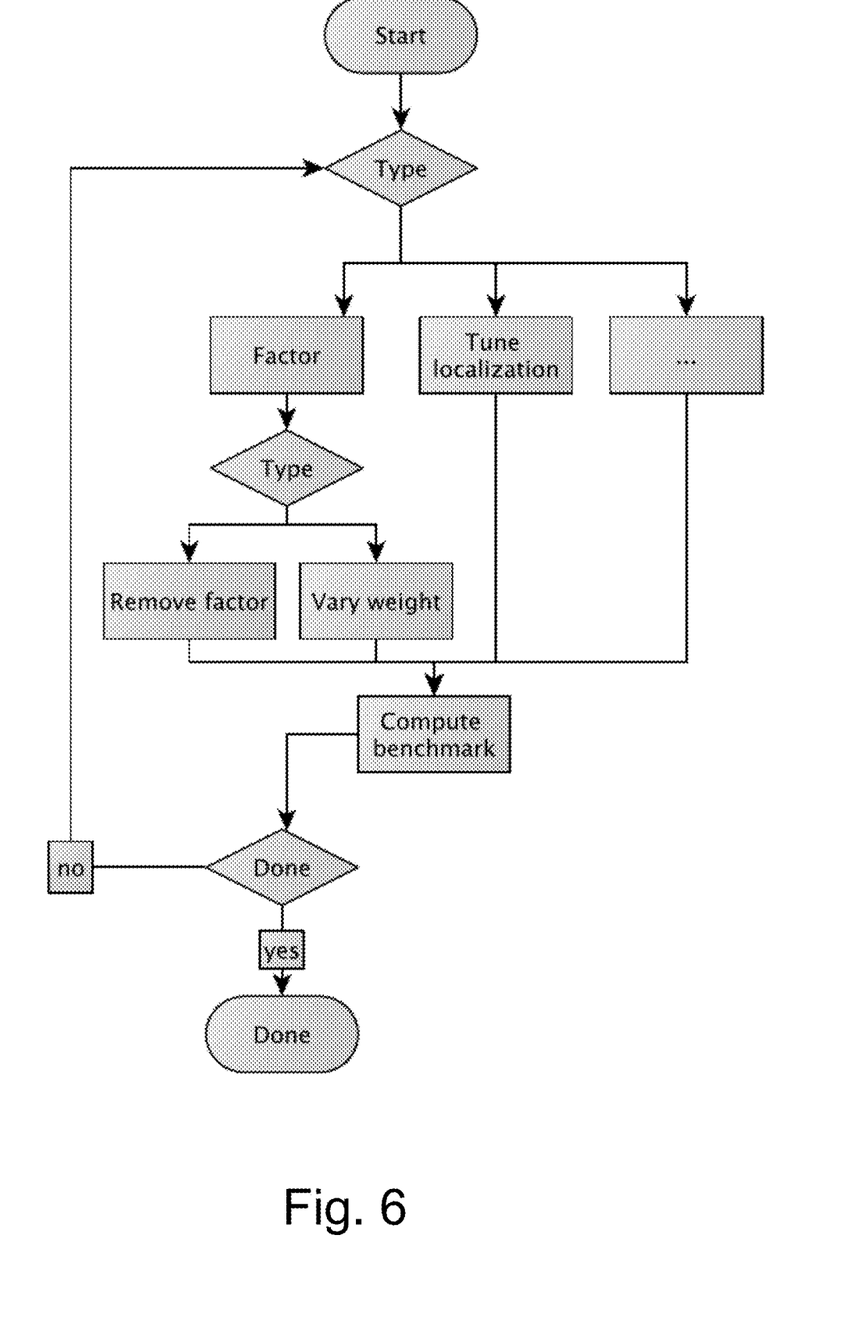
FIG. 6 shows a flowchart for repeated benchmarks.

A similar but more computationally intensive approach is to perform repeated benchmarks while varying the weights of individual factors until the benchmark residual reaches a minimum. Weighting has the benefit that systematic errors in the localization can be corrected. Factors with extreme weights or relative influence can be flagged and acted upon before shipping a map to a client. Factors with high weight or influence factors might be flagged due to a potential measurement error, whereas factors with low weight or influence might be flagged for data thinning (removal) as their impact on localization is insignificant. A flowchart for the repeated benchmarks is shown in FIG. 6.

According to the invention, the method can further be applied to identify erratic signal sources or misleading reference points in a radio-based localization method. The signal sources and the reference points are factors largely determining the localization quality. Thus, unreliable sources or references should be removed (approach A) or down weighted (approach B).

For this, the following steps are performed: calculate a benchmark score for at least one query path, wherein at least one signal source or reference point in the reference table is deleted or ignored, repeat with different signal sources or reference points, identify the set of signal sources or reference points which have to be removed to result in the minimal benchmark score.

Sets of reference factors to examine can be any reference point or signal source. For each factor, reconstructed paths are calculated leaving that single factor out, and dynamic benchmark of known versus reconstructed paths is calculated. Then, benchmark scores are compared for each factor to the baseline score. If no factor has a score lower than baseline or some number of maximum iterations has been exceeded stop iterating. If some factor has a score lower than baseline, then (approach A) the lowest factor is taken out and the method repeats from previous step, or (approach B) the weight of factor is reduced by scaling it with some fraction. This weight factor is then used in localization when reconstructing paths. Finally, in approach A, the map is saved with taken out factors removed, wherein in approach B the final weights are saved with the map so they can be applied in the locating method. Factors with very low weights can be removed from the map entirely. Reference points taken out could be improved by remeasuring.

Figure 7:
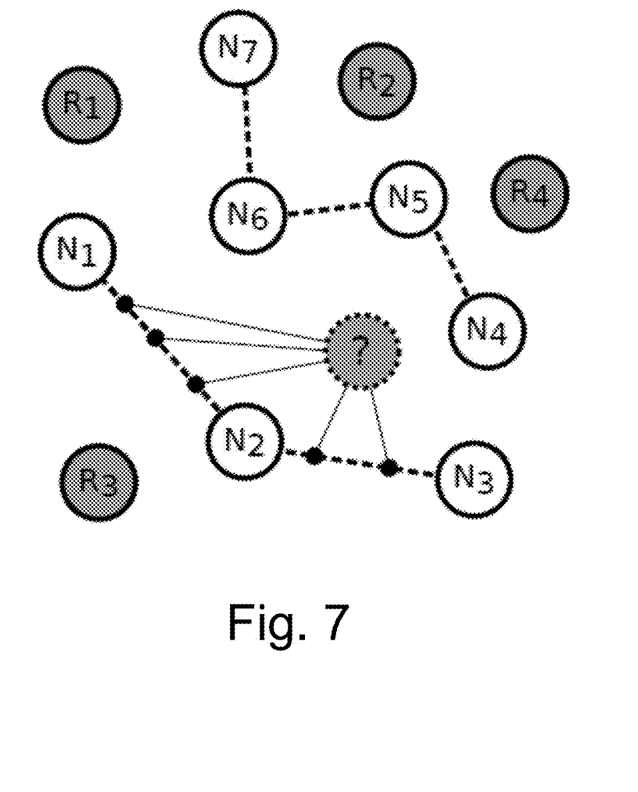
FIG. 7 shows a method of creating new reference points from existing path recordings.

According to the invention, a further embodiment provides for a method to create new reference points, wherein new reference points are created along a query path, wherein the position is calculated using linear position interpolation based on time steps ti, and the received signal strength is calculated by interpolation of measured signal strengths, preferably within a time window. The virtual reference points can also be added at any position apart from the query path, particularly at a position that cannot be reached by a device, such as inside a wall, wherein the signal strength is calculated by interpolation of measured signal strengths. FIG. 7 shows the principle method of creating new reference points from existing path recordings. A map has some reference points R1, . . . , R4, a source recording N1, . . . , N3 and a reference recording N4, . . . , N7. The source recording contains data entries. The location of a data entry can be found through linear interpolation, just like a corresponding point. To create the new reference points, the weighted mean of all data entries within some predetermined time window (typically 5-10 s, depending on source) is calculated.

As a weight w=1/(distance(data entry, reference point)+epsilon) can be used, where epsilon is some small number to prevent division by 0. Using the existing map and the new reference the estimated and known path of the reference recording can be benchmarked. The procedure is iterated with different reference locations until a minimal benchmark score is reached.

Further aspects and embodiments of the invention are described as follows.

Stationary measurement of reference point is costly as it takes considerable time. By measuring while walking the cost is reduced, possibly at the cost of accuracy. New reference points can be mapped from known path recordings. As input data, reconstructed recordings along known paths are used. The path is split into segments by some time window. Time windows can either be sequential or overlapping. The start, mid, and end points of the segment is found by linear interpolation of the known path nodes. The reference point location is taken to be the mid point of the segment. Measurements within the time window are assigned to the reference point. To compensate for time window size a weight based on distance from mid point can be assigned to reference measurements.

The method can further be used to compare the reconstructed path from a known path with that of a path generated with virtual fingerprints. This can be used to verify the validity of virtual fingerprints. Individual transmitters with consistently large residual errors can be tagged as likely to have been moved or altered in some way since the reference fingerprint points were measured. Similarly, regions found to have large residual errors might in some way have had their radio environment altered.

Unknown paths from clients running positioning on their mobile devices can be harvested and accumulated over time. These paths may be as simple as a single fingerprint measurement, but can be of arbitrary length. Using the localization, the reconstructed paths can be calculated from the harvested unknown paths. The reconstructed data set can be used for map usage diagnostics.

A multivariate Gaussian may be used to model a single reconstructed position with its corresponding error. Here, the Gaussian is the mapping from a spatial point to a position probability. For multiple positions the Gaussians are superpositioned and normalized so that a position probability field is obtained. Two dimensional slices or projections can be used to render this field as a heat map that can be superimposed on a graphical map. At the cost of accuracy a fast sparse sampling of the field can be made and bilinear filtering can be employed to still get good rendering quality.

By splitting the field into discrete bins trends can be examined. A multitude of such binnings can be employed either alone or in some combinations. Bins can amongst other things be static zones defining different areas of interest on the map, they can be time slices to allow for examining trends, or they can be a category of client. Possible categories include clients who visited a certain zone, clients who are using a particular kind of mobile device, or clients who performed some action of interest. Combining trend and zone binnings clients movement patterns can be studied.

Figure 8:
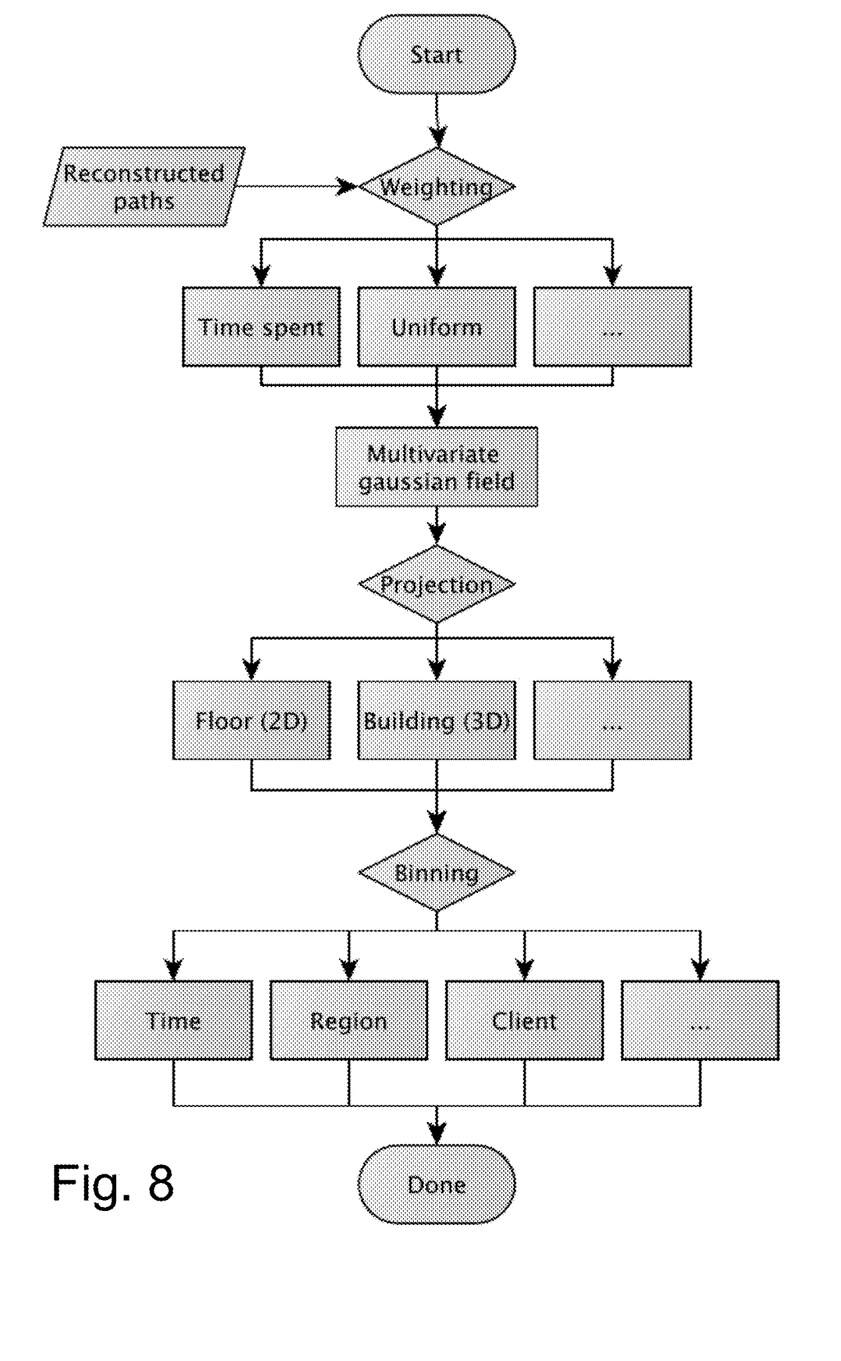
FIG. 8 shows a flow chart illustrating the construction of the binned and weighted heat map projected from a Gaussian localization field.

Different aspects of the map can be diagnosed by choosing the appropriate weights used for normalization of the field. A uniform weight can be employed to view how frequently different positions are reconstructed. Taking the weight as the time spent around the time at the location, for example from half between the previous and current point to half between the current and next point, the time spent at each position can be visualized. Other factors that can be explored could be the amount of mobile data traffic used, the number of photos taken, the amount of money spent, the number of tweet messages sent, etc. With this the paths provide a useful diagnostic tool for the provider of the maps. A flow chart illustrating the construction of the binned and weighted heat map projected from the Gaussian localization field is given in FIG. 8.

Instead of working on aggregation of single locations it is possible to also work on path segments. Here, two neighboring locations p and q are joined together by a straight line. The uncertainty along the line is modeled by a Gaussian radial basis function (RBF)$\phi(r, \sigma(f))$. Here, r is the distance between the test point and its point of closest approach to the line, f the fraction of the distance travelled from p to q, and $\sigma(f)$ the width parameter at the point of closest approach.

Adding the linearly interpolated contributions from two points in quadrature gives $\sigma(f)=\sqrt{(f\sigma_p)^2+((1-f)\sigma_q)^2}$. Multiple such lines are joined together for longer path segments. Analogous to the previous sections, binned weighted heat maps can be projected from a field created from these Gaussian path segments.

In addition, path overlaps can be studied. Points along a reference path segment are compared to points on corresponding positions along the query path segment. The corresponding position can be modeled as the position at the same fraction of the total path length. The RBF probability for the points are multiplied to form a matching likelihood. The reference paths segments can be from known paths or just the paths from earlier queries. With this similar segments can be merged and the most common paths through the building can be mapped.

A further aspect of the invention relates to predictions of multiple radio signal strengths and signal properties at positions in between points with preexisting measurements and the use of these predictions for the purpose of accurate positioning, in particular indoor positioning. These predicted values can be used to alleviate several of the problems associated with fingerprint based positioning. Furthermore, it can also be used for benchmarking and more advanced localization algorithms.

The core concept is to use interpolation with some bounding to prevent extrapolation errors. The interpolated values can trivially be used to provide signal strength heat maps that can be a powerful visualization aid for showing how signals behave between the reference points. The interpolation is also employed to create new virtual fingerprint points at strategic positions around the reference maps. These virtual fingerprint points can help fill in sparse regions of the map, even out the fingerprint point density and correct missing fingerprints or add points to counteract biases in the location algorithms. Fingerprint predictions may also be used for reference map benchmarking and as building blocks for new improved mapping and localization algorithms.

The basic approach is the interpolation of signal strength through the use of radial basis functions (RBF) to transform the value at a known position p to an unknown position q. The RBFs are denoted as $\phi(r,\varepsilon)$ where r is the distance $d(p,q)$ in some metric, and $\varepsilon$ is a width parameter affecting how signal strength changes with distance. A multitude of possible choices of RBFs are available including thin plate spline, Gaussian, multiquadric, inverse quadratic and inverse multiquadratic. Furthermore, there are several possible metrics choices including the Minkowski metrics $d(x,y)=(\Sigma_i|x_i-y_i|)^{1/p}$, cosine and Pearson correlation metric. For the WiFi RSS data, the multiquadric function $\phi(r,\varepsilon)=\sqrt{1-(\varepsilon r)^2}$ and standard Euclidean distance (Minkowski with p=2) is a well suited choice.

The ideal value for $\varepsilon$ depends on the choice of $\phi$, d and the distribution of the reference points. In principle it should be tuned so that the global interpolation error is minimized. The same method can be used to determine which metric and RBF function to choose. As this might require a time consuming optimization, it is often enough to take some percentile of the closest point distance distribution on the map, assuming point density is approximatively uniform. For maps with regional point density non-uniformities, different interpolations can be employed on different map areas.

Given N measurement points $y=\{(x_1;s_1), \ldots ,(x_N;s_N)\}$ where $x_i$ is the coordinate and si the signal strength of the i:th point, the interpolation equation is written $Aw=y$ where A is a matrix with elements $A_{i,j}=\phi(d(x_i,x_j),\varepsilon)$ and w a vector of unknown weights. This is solved as $w=A^{-1}y$. The matrix inverse can be calculated for example through Singular Value Decomposition (SVD).

Figure 9:
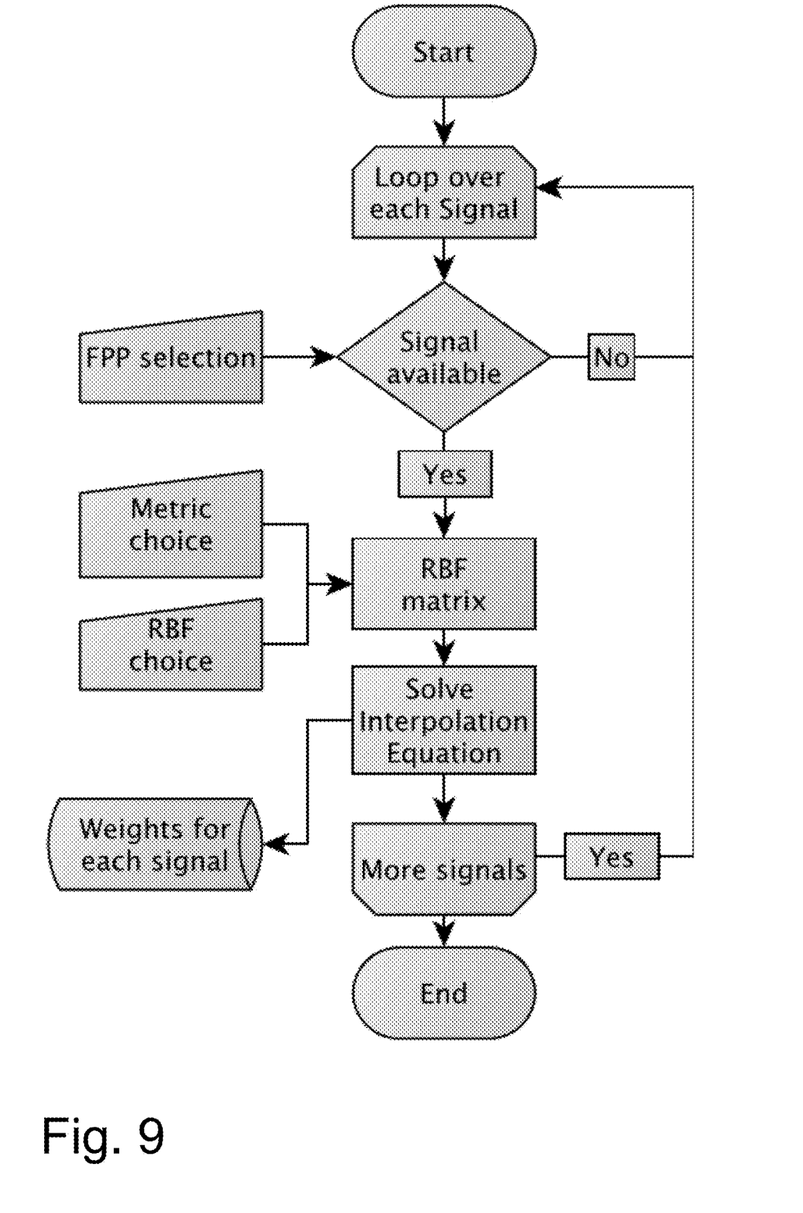
FIG. 9 shows a process of solving of the radial basis interpolation for fingerprints.

The process of solving of the radial basis interpolation for the fingerprints is shown in FIG. 9. The equation must be solved individually for each signal involved. The set of points to use may be different for each of these solutions. The selection of fingerprints to use can depend on multiple factors such as region, measuring device, and timing. The choice of metric and RBF can be different for each signal, but are typically the same for each category of signals. The weights for each signal can be stored for usage in subsequent interpolation steps.

With the weights calculated, the signal strength s at some unknown position x is predicted as $s=\Sigma_i w_i \phi(d(x,x_i),\varepsilon)$, where $w_i, x_i$ is the weight and position for the i:th point respectively.

Figure 10:
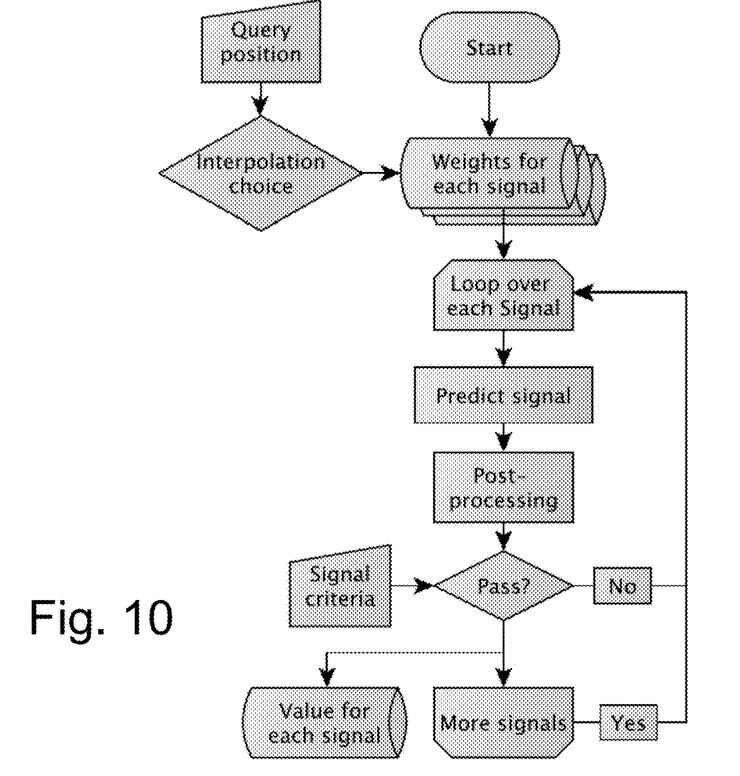
FIG. 10 shows a flowchart of a process of predicting a set of fingerprints at a point.

FIG. 10 shows a flowchart of the process of predicting a set of fingerprints at a point is given. First, the solved weights are selected depending on the query position (and possibly some other factors). Next, the predicted values for each signal are calculated. Finally, values are tuned in a post processing step and criteria on the final value are posed to avoid extreme predictions. The pure RBF interpolation does not take into account constraints from walls or how far away from the source points values are extrapolated nor the range of physically measurable signal strengths. These issues are handled in the post-processing and signal selection steps.

A common issue with interpolation procedures is that there can be large interpolation errors when extrapolating far outside the points for which the interpolation was solved. To avoid extrapolating too far from input fingerprint points, a point distance potential function is defined. This function is defined by a RBF that decays with some distance d between the query point and some function of the input points. While any RBF can be used, often a Gaussian for a smooth transition or a step function for a fast transition is used. The distance dependence could be many things. For instance, the distance to the closest edge of the convex hull surrounding the reference points, the distance to the closest reference point, the average distance to the k-nearest reference points, or the distance to some hand defined polygon. The calculation speed can be reduced by first checking a convex hull with a step RBF and then only if inside going to a more complex potential with a Gaussian RBF. The field can be used in the signal selection step directly, or applied as dampening factor in the prediction step. A similar field can also be defined using walls and non-navigable areas on the map which can be useful as a prior to positioning and other calculations.

Interpolation resulting in signal strength outside a tunable valid range will be rejected in a further step. This avoids unphysical results that could be detrimental to accuracy. To accommodate for regions where a transmitter cannot be detected, it is possible to add points at a very low signal strength into the interpolation.

Using interpolated values a heat map of the signal strength distribution can be made. The heat map is constructed calculating the field strength at a grid of positions on the map. The strength range can be mapped to a color scale and the interpolated strengths can thus be rendered to give a visualization of the strength distribution. For better overlays the color scale can have a transparent component so that weak signal strength contribute less to the rendered map. It is easier to see the behavior with this visualization than with to just have the values at the finger print points.

As the calculation of the signal strength and bounding fields can be quite demanding, a bilinear filtering can be used to smoothly interpolate a sparser grid in the signal strength. This can also be done with recursively denser grids to give a progressive render of the heat map with more details added over time.

By mapping the bounding field to transparency when rendering, it is possible to turn of the heat map to avoid extrapolation too far outside the source points. Alternatively, the same field can be used to reduce signal strengths far outside the source points where a signal threshold can ensure the heat map does not include too far extrapolations.

Figure 11:
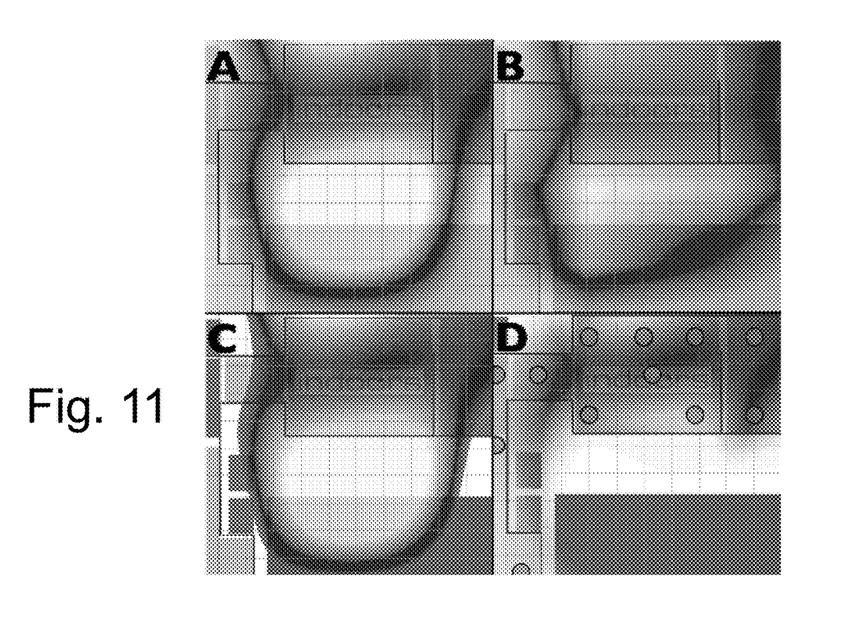
FIG. 11 shows examples of heat maps superimposed on the map from where they were generated.

FIG. 11 shows examples of heat maps superimposed on the map they were generated from. Panel A shows the full heat map. Bilinear filtering is used in panel B; only a fraction of points use the RBF interpolation, thus speeding rendering up significantly. A signal threshold has been mapped to transparency to highlight only the strong signal region in panel C. A transparency bounding box have been applied to only include points near the fingerprint points (blue) in panel D.

In addition to applications for individual sources, heat maps can be made for groups of transmitters. Possible groupings include transmitters of a certain model, brand, owner, or using a certain selection of channels. Instead of interpolating in signal strength some descriptive statistic measure is used. For instance this statistic could be the maximum signal strength, the sum of signal strengths, the average signal strength, or the number of received signals. An example use case of this approach is to show coverage for a wireless service provider can be determine using only the providers devices and showing maximum signal strength statistic above a some minimum threshold.

Using the interpolations and the potential functions together, it is possible to generate virtual fingerprint points to improve positioning accuracy and stability. The virtual points can also be generated along a path to simulate navigation on the map. The placement of the points can be determined in several ways. These include using random placement, on some well defined grid, avoiding close proximity to existing points, and avoiding non navigable areas such as walls. Furthermore, around important features such as doors, stairs and walkways points can be generated to improve performance. Virtual points can also give points in inaccessible places, such as open holes or stages. These generated points can be calculated beforehand and saved to the map. This reduces memory usage and reduces the processing load on devices.

The interpolation error $\Delta_i=|s_i-s_t|$ is the difference between the value obtained from interpolation $s_i$ and a true measurements $s_t$ at the point. Using a set of test fingerprint points, it is possible to use $\Delta_i$ as a benchmark to compare reference fingerprint points on a map. An existing map point may be used as a test point if leaving it out when solving the interpolation. Iterating over all map fingerprint points this way allows for benchmarking of the complete map with no additional measurements.

If $\Delta_i$ is very low for a point, it is possible that it could be removed from the map without degrading positioning accuracy. This way the interpolation benchmark can be used for data thinning in order to provide smaller reference maps for mobile applications. On the other hand, if $\Delta_i$ is very large it could be an indication that the ground truth supplied for the point is incorrect or that the measurement was not well made. The high error points can be flagged for remeasuring. Regions with too low sampling density may be identified by having a large $\Delta_i$ and be flagged for additional measuring, conversely regions with too high sampling density can be identified and be flagged for data thinning.

Fingerprints and calculated positions harvested from navigating clients can be used to produce test points. This can yield large amounts of independent testing data, although due to the positioning error and limitations of mobile devices these test points are less accurate than map references.

As this data is taken after the reference map was made, benchmarks can be used to detect if the reference map is up to date. Using timestamps from these positions enables trends to be made and analyzed for more detailed understanding of the map environment. Furthermore, differences between different mobile devices can be detected this way, which amongst other things can be used to identify potential calibration problems.

Dynamically generated virtual points in the vicinity of the previously calculated position can be used in the localization. These points will act as a bias to nearby positions when calculating the next position, and this can reduce issues with large jumps in the positioning. An alternate approach is to sample virtual points until one that agrees sufficiently with the latest measurement and use as a location guess. Virtual points call also be used to implement estimators for fingerprints of particles in a particle filter, for example for use in a Simultaneous Localization And Mapping (SLAM).

When comparing fingerprint recordings virtual points can be used to account for ground truth sets between the recordings. Here, virtual points are created from the recordings so that the ground truth positions coincide. This is often needed when updating an existing reference map or when comparing paths recorded from positioning clients.

Using the heat map it is possible to calculate the signal gradient at each reference fingerprint point. This can be used to determine the location of unknown transmitters, and also to determine features that affect the transmitted signals through dampening or reflection by walls and other obstacles in the building. In cases with a single clear maximum, the heat map gives a trivial estimate of transmitter locations. Given a transmitter model and a building model, a theoretical heat map can be calculated and compared to the heat map obtained from measurements. This can be used to infer building features by manipulating hypothetical features in the building model until the theoretical and measurement heat maps agree.

In an embodiment of the method, a local particle filter is applied. Using only virtual fingerprint points it is possible to estimate the location of a set of signals measured at an unknown position. Input data are Previous positions from location reconstruction, reference points in local area, and signals measured at current position.

Then, a set of virtual fingerprint points in an area around a previous position is calculated. If the previous position is unknown a large number of points covering the complete area can be used. Then, the separation between each virtual fingerprint point and current measured signal set is calculated. The separation can be any signal based distance measure, i.e. Euclidean distance between signals, Spearmans foot-rule based score, etc. After this, the point with lowest separation is used as current position, and the method is repeated for the next set of measured signals.

In a further embodiment, the method can be used to calculate a benchmark score using virtual fingerprints. By examining the interpolation error anomalous reference points can be identified. The input data comprises reference map points and virtual points generated at reference map point positions. For each reference point, the interpolation error is calculated with respect to the corresponding virtual point.

The Interpolation error is $$\varepsilon = \sum_i |s_i - s_i^*|,$$

where si is the i-th reference signal and si* is the i-th interpolated reference signal. Points with high interpolation error may be poorly measured or affected by local environment. Possible improvements are to remeasure or add additional nearby points.

In a further embodiment, the method is used to generate signal heat maps from radial basis function (RBF) interpolation. RBF interpolation is a powerful tool to visualise signal distribution on the map. However it is very slow. In this embodiment, interpolation is sped up using quick but less accurate bilinear filtering on a fine grid in between more accurate RBF interpolated points. Input data comprises reference map points. In a first ste, the RBF interpolation is solved for selected signal sources. Then, a coarse grid covering the map is generated. At each point the predicted signal strength is calculated using RBF interpolation. Then, a fine grid is calculated inside coarse grid cells. At each fine grid point the signal strength is calculated using bilinear filtering. A normalised scale is created with 0 corresponding to minimal signal strength on coarse grid, and 1 corresponding to maximum. Then, each fine grid cell is colored looking up normalised signal strength in some color mapping.

The invention is not limited to any of the described embodiments but comprises all methods within the scope of the claims.

What is claimed is:

1. A method to determine an estimated quality of a query path between at least two points in a geographical area, in which the query path is estimated using radio-based localization with a reference map having known reference points which are linked to recorded fingerprints from a signal source at the reference points, the method comprising:
   gathering, using a mobile device, a number of fingerprints between at least two known locations and at distinct time steps, and then storing the gathered fingerprints at the locations in the mobile device;
   querying, via the mobile device, the radio-based localization to estimate query locations at every time step based on the fingerprints, wherein all query locations define the query path;
   in a post-processing step, via the mobile device, for each query location in the query path:
      determining a corresponding point between the known points based on recorded time steps and a distance between the known points, and
      calculating a residual between the query location and the corresponding point,
   calculating, via the mobile device, a benchmark score based on all calculated residuals over the query path, wherein a lower benchmark score indicates a better estimation quality; and
   correcting for time delay, via the mobile device, by:
      calculating a benchmark score for a query path, wherein an offset is added to the time step at every query location;
      repeating the correcting for time delay with a different time step offset within a range of the time step offset; and
      identifying the time step offset which results in a minimal benchmark score.

2. The method of claim 1, further comprising comparing, via the mobile device, the estimation quality of at least two query paths, which can be based on the same or different known points, and result in the same or different query locations.

3. The method of claim 2, wherein calculating the benchmark score comprises calculating a benchmark score for each query path, and comparing the resulting benchmark scores.

4. The method of claim 1, further comprising determining, via the mobile device, a path estimation quality of a sub-path inside a sub-area of a geographical area, including:
   calculating, for at least one query path between at least two points within a geographical area covering several sub-areas, the baseline benchmark score;
   dividing the query path into sub-paths within distinct contiguous geographical regions, based on a uniform grid, or on geographic criteria;
   calculating, for each sub-path, a benchmark score; and
   comparing the calculated sub-path benchmark score to a baseline benchmark score to determine regional path estimation quality.

5. The method of claim 1, further comprising determining, via the mobile device, a temporal drift of path estimation quality, including:
   calculating, for at least one path, a baseline benchmark score;
   calculating, at later points in time, further benchmark scores for the same path;
   identifying recurring patterns of variation or decay of estimation quality by comparing the difference between the benchmark scores and the baseline benchmark score over time.

6. The method of claim 1, further comprising improving, via the mobile device, a path estimation quality in radio-based localization, including:
   calculating, for at least one query path, a baseline benchmark score, wherein at least one parameter of the radio-based localization is adjusted;
   repeating the calculating using different values of the parameters of the radio-based localization; and
   identifying a set of adjustments which results in a minimal benchmark score.

7. The method of claim 1, further comprising identifying, via the mobile device, erratic signal sources or misleading reference points in radio-based localization, including:
   calculating, for at least one query path, a baseline benchmark score, wherein at least one signal source or reference point in a reference table is deleted or ignored;
   repeating the calculating using different signal sources or reference points; and
   identifying a set of signal sources or reference points to be removed to result in a minimal benchmark score.

8. The method of claim 1, further comprising creating, via the mobile device, new reference points in radio-based localization, including:
   calculating, for at least one query path, a baseline benchmark score; and
   adding a virtual reference point, wherein a position of the virtual reference point is calculated using linear position interpolation based on the time steps and the known positions, and the received fingerprint value is calculated by interpolation of measured fingerprints within a time window.

9. The method of claim 1, further comprising creating, via the mobile device, new reference points in radio-based localization, including:
   calculating, for at least one query path, a baseline benchmark score;
   adding a hypothetical reference point at any chosen position apart from the query path, at a position that cannot be reached by a device, wherein the fingerprint value is calculated by interpolation of measured fingerprints;
   calculating, for the at least one query path, a baseline benchmark score; and
   repeating each of the calculating and the adding until the benchmark score is improved over the baseline benchmark score.

10. A method to determine an estimated quality of a query path between at least two points in a geographical area, in which the query path is estimated using radio-based localization with a reference map having known reference points which are linked to recorded fingerprints of signal sources at the reference points, the method comprising:
   gathering, using a mobile device, a number of fingerprints between at least two known locations and at distinct time steps, and then storing the gathered fingerprints at the locations in the mobile device;

querying, using the mobile device, the radio-based localization to estimate query locations at every time step based on the fingerprints, wherein all query locations define the query path;

in a post-processing step, using the mobile device, for each query location in the query path:
determining a corresponding point between the known points based on recorded time steps and a distance between the known points, and
calculating a residual between the query location and the corresponding point, calculating, using the mobile device, a benchmark score based on all calculated residuals over the query path, wherein a lower benchmark score indicates a better estimation quality; and determining temporal differences, using the mobile device, by:
calculating a baseline benchmark score for at least one query path,
calculating further benchmark scores for the same query path at later points in time, and
identifying recurring patterns of variation or decay of estimation quality by comparing a difference between the benchmark scores and the baseline benchmark score over time.

11. The method of claim 10, wherein the temporal differences are temporal drift of path estimation quality.

12. The method of claim 10, wherein gathering the number of fingerprints comprises moving a signal receiver along a straight line at a constant speed between the at least two known locations.

13. The method of claim 10, wherein the corresponding point is determined by linear interpolation between the known points.

14. The method of claim 10, wherein the calculated residual is a Euclidean distance between the query location and the determined corresponding point.

15. The method of claim 10, wherein the benchmark score is calculated by using a mean value, a median value, percentiles, or extreme values of the calculated residuals.

16. The method of claim 10, further comprising:
calculating, via the mobile device, respective benchmark scores for at least two query paths, to be based on a same or different known points, and result in a same or different query locations; and
comparing the resulting benchmark scores.

17. The method of claim 10, further comprising:
calculating, via the mobile device, a baseline benchmark score for at least one query path between at least two points within a geographical area covering several sub-areas;
dividing, via the mobile device, the at least one query path into sub-paths within distinct contiguous geographical regions, based on a uniform grid, or on geographic criteria;
calculating, via the mobile device, a benchmark score for each sub-path; and
comparing, via the mobile device, the sub-path benchmark score to the baseline benchmark score to determine regional path estimation quality of the sub-path inside the sub-area of the geographical area.

18. The method of claim 17, wherein the geographic criteria comprises rooms or floor levels.

19. The method of claim 10, further comprising:
calculating, via the mobile device, a baseline benchmark score for at least one query path;
adding a virtual reference point at any chosen position apart from the at least one query path, including calculating a fingerprint value by interpolating measured fingerprints;
calculating, via the mobile device, a benchmark score for the same at least one query path; and
repeating calculating the baseline benchmark score and calculating the benchmark score until the benchmark score is improved over the baseline benchmark score.

20. The method of claim 19, wherein the chosen position comprises a position that cannot be reached by a device.

21. The method of claim 19, wherein the chosen position is inside a wall.

22. The method of claim 19, wherein the measured fingerprints are measured signals from a source.

* * * * *